R. C. GREENE.
MILK-COOLER.

No. 191,849.  Patented June 12, 1877.

WITNESSES:
Francis McArdle
J. H. Scarborough

INVENTOR:
R. C. Greene
BY
[signature]
ATTORNEYS.

UNITED STATES PATENT OFFICE.

ROLLIN C. GREENE, OF POTSDAM, NEW YORK, ASSIGNOR TO HIMSELF AND NATHAN P. CHANEY, OF SAME PLACE.

IMPROVEMENT IN MILK-COOLERS.

Specification forming part of Letters Patent No. 191,849, dated June 12, 1877; application filed December 18, 1876.

*To all whom it may concern:*

Figure 1:
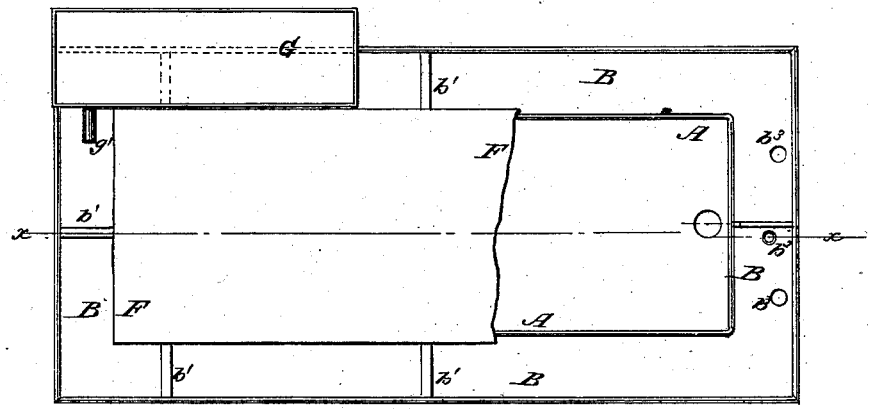
Figure 2:
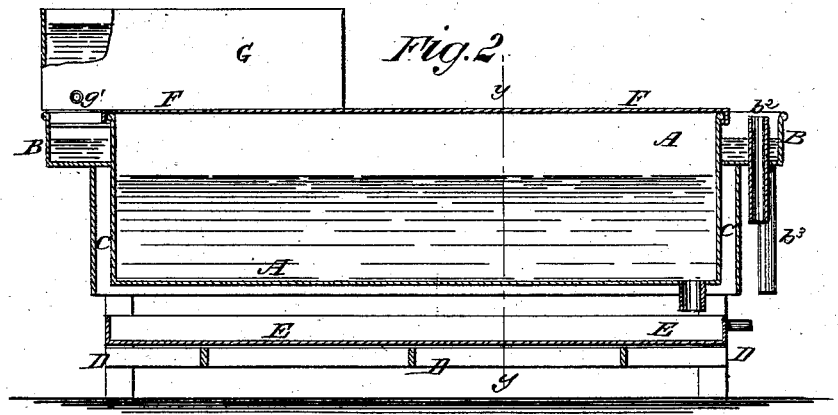
Figure 3:
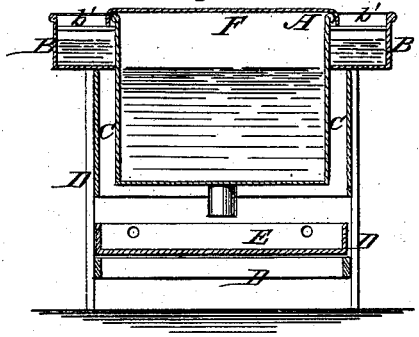

Be it known that I, ROLLIN C. GREENE, of Potsdam, in the county of St. Lawrence and State of New York, have invented a new and useful Improvement in Milk-Pan, of which the following is a specification:

Figure 1 is a top view of my improved pan, part of the cover being broken away. Fig. 2 is a vertical longitudinal section of the same, taken through the line $x\ x$, Fig. 1. Fig. 3 is a vertical cross-section of the same, taken through the line $y\ y$, Fig. 2.

Similar letters of reference indicate corresponding parts.

The object of this invention is to furnish an improved milk-pan, which shall be so constructed as to enable the milk while in the pan to be cooled or warmed, as may be required.

The invention consists in a milk-pan, having a top tank, a surrounding air-chamber, and a bottom tank, as will be hereinafter more fully described, and then pointed out in the claims.

A represents the milk-pan, the upper part of which is surrounded with a tank, B. The tank B is attached at its inner side to the pan A, and is further supported by bars $b^1$ attached to its outer edge, and to the pan A. The tank B is supplied with an overflow-pipe, $b^2$, and with one or more outlet-pipes, $b^3$. The pan A is surrounded with an air-chamber, $c$, extending from the tank B to the bottom of the pan A, and the bottom of which may be open or closed, as may be desired. The pan A is attached to a frame, D, to suspend it and raise it to a convenient height, and upon the cross-bars of which, directly beneath the bottom of the pan A, is placed a tank, E, for cooling or warming the pan A, as may be required.

The pan A is provided with a cover, F, which may be made air-tight or not, as may be desired. G is a tank designed to be set upon one corner of the pan, and from which water may be allowed to flow into the tank B, through a small pipe, $g'$.

Having thus described my invention, I claim as new and desire to secure by Letters Patent—

1. The combination, with the milk-pan A, of the top water-tank B, and the surrounding air-chamber C, below said tank, substantially as and for the purpose set forth.

2. The milk-pan herein described, consisting of the pan A, top water-tank B, surrounding air-space C, bottom tank E, feed-tank G, and supporting-frame D, as and for the purpose set forth.

ROLLIN C. GREENE.

Witnesses:
S. C. CRANE,
W. M. HAWKINS.